United States Patent [19]

Borkiewicz

[11] Patent Number: 5,509,664
[45] Date of Patent: Apr. 23, 1996

[54] SEGMENTED HYDRODYNAMIC SEALS FOR SEALING A ROTATABLE SHAFT

[75] Inventor: Mark R. Borkiewicz, Hatfield, Pa.

[73] Assignee: Stein Seal Company, Kulpsville, Pa.

[21] Appl. No.: 93,365

[22] Filed: Jul. 19, 1993

[51] Int. Cl.$^6$ .................................................... F16J 15/44
[52] U.S. Cl. .......................... 277/3; 277/142; 277/175; 277/199
[58] Field of Search .................................. 277/173, 174, 277/175, 157, 192, 197, 199, 3, 142, 148, 163, 176, 177

[56] References Cited

U.S. PATENT DOCUMENTS

| | | | |
|---|---|---|---|
| 1,860,267 | 2/1931 | Smittle | 277/157 |
| 2,908,516 | 10/1959 | Stein | 277/142 |
| 3,575,424 | 4/1971 | Taschenberg | 277/154 |
| 4,082,296 | 4/1978 | Stein | 277/3 |
| 4,406,466 | 9/1983 | Geary | 277/96.1 |
| 4,426,087 | 1/1984 | Sargent et al. | 277/199 |
| 4,943,069 | 7/1990 | Jinnouchi | 277/142 |
| 5,039,115 | 8/1991 | Herbert et al. | 277/175 |
| 5,058,904 | 10/1991 | Nevola | 277/157 |

FOREIGN PATENT DOCUMENTS 0443579  8/1991  European Pat. Off. ............... 277/199

Primary Examiner—William A. Cuchlinski, Jr.
Assistant Examiner—John L. Beres
Attorney, Agent, or Firm—Zigmund L. Dermer

[57] ABSTRACT

A seal for sealing between a rotating shaft and a housing comprising a seal ring formed by a plurality of circumferentially spaced segments mounted for movement toward and away from the shaft and having a high pressure side, a low pressure side, an inner circumferential face opposed to the shaft and an outer circumferential face. Resilient means urge the seal ring toward the shaft. Hydrodynamic means in the form of one or more plurality of spaced recesses in the inner circumferential face of each segment are formed so as to produce negative hydrodynamic lift in the recess and urge the seal ring segments toward the rotating shaft during normal rotation thereof. The seal segments are circumferentially spaced with the radial space between adjacent segments mated by complementary tongues and grooves formed in adjacent seal segments. The segments are in contact to form a continuous seal. The tongue and groove at each radial space between adjacent seal segments form a seal therebetween, however, under certain circumstances, pressure may build up in the radial space causing leakage of fluid along the radial space. In order to relieve this build-up, a pressure reducing passageway is formed in each tongue portion extending from the radial space to the adjacent end of the adjacent recess in the seal segment to cause fluid flow from the radial space into the recess to prevent seal leakage. A second seal is provided between the housing and the low pressure side of the seal ring.

7 Claims, 2 Drawing Sheets

SEGMENTED HYDRODYNAMIC SEALS FOR SEALING A ROTATABLE SHAFT

BACKGROUND OF THE INVENTION

In his U.S. Pat. No. 4,082,296, issued in the United States on Apr. 4, 1978, P. Charles Stein provided a plurality of embodiments of sealing members for sealing between a rotating member and a housing. The sealing members were provided in one embodiment in the form of a segmented seal ring resiliently mounted about a shaft or a sleeve mounted on the shaft to move toward and away from the shaft to provide a seal therebetween. The seal ring is segmented by providing a plurality of circumferential segments end to end to form the seal ring and such that a seal is also effected in the radial direction between each segment. In the circumferential sealing face of each segment of the seal ring adjacent the shaft, predetermined precise grooves are provided which produce a negative hydrodynamic lift force and urge the seal ring segments toward the rotating shaft in order to reduce leakage thereacross. Thus, during shaft rotation, the medium in which the seal is operating, e.g. oil, water or gas, is swept out of the sealing grooves through an axially disposed communication port by a pumping action to provide the negative hydrodynamic lift force and to move the seal ring toward the shaft to effectuate greater sealing. Thus, the pressure in the grooves of the sealing faces of the sealing ring during shaft rotation is lower than system pressure.

The seal in the radial direction between each seal segment is formed between a tongue portion of the seal segment at the end of the face groove remote from the axial communication port thereof which is received in a complementarily-shaped groove formed in the adjacent end of the adjacent seal ring segment. In certain applications, especially when the seal is operating in a pressurized oil mist atmosphere, pressure tends to build up in the space between the tongue of one segment and the complementary groove in the adjacent segment. This pressure build-up, if sufficient, could result in leakage along the radial path between adjacent segments. The purpose of this invention is to provide a modification of the Stein seal ring arrangement for use with rotatable shafts to overcome this objection to the seal ring design. The potential axial leakage problem which may occur is solved by this invention.

SUMMARY OF THE INVENTION

This invention provides a segmented seal ring surrounding a rotatable shaft and effecting a circumferential seal therebetween. The seal ring is formed by a plurality of circumferential segments placed end to end, each segment in the inner circumferential face thereof having a configuration including at least one pumping groove which provides a negative hydrodynamic lift force which tends to move the seal ring segments toward the shaft to reduce leakage therebetween. A seal is also effected between the ends of each seal segment to prevent leakage in the radial direction and in order to reduce the pressure in between each segment, a path is formed in each seal segment extending from the region thereof between adjacent seal segments and the pumping groove to reduce the pressure between the seal segments and avoid radial leakage between seal segments.

DETAILED DESCRIPTION

Figure 1:
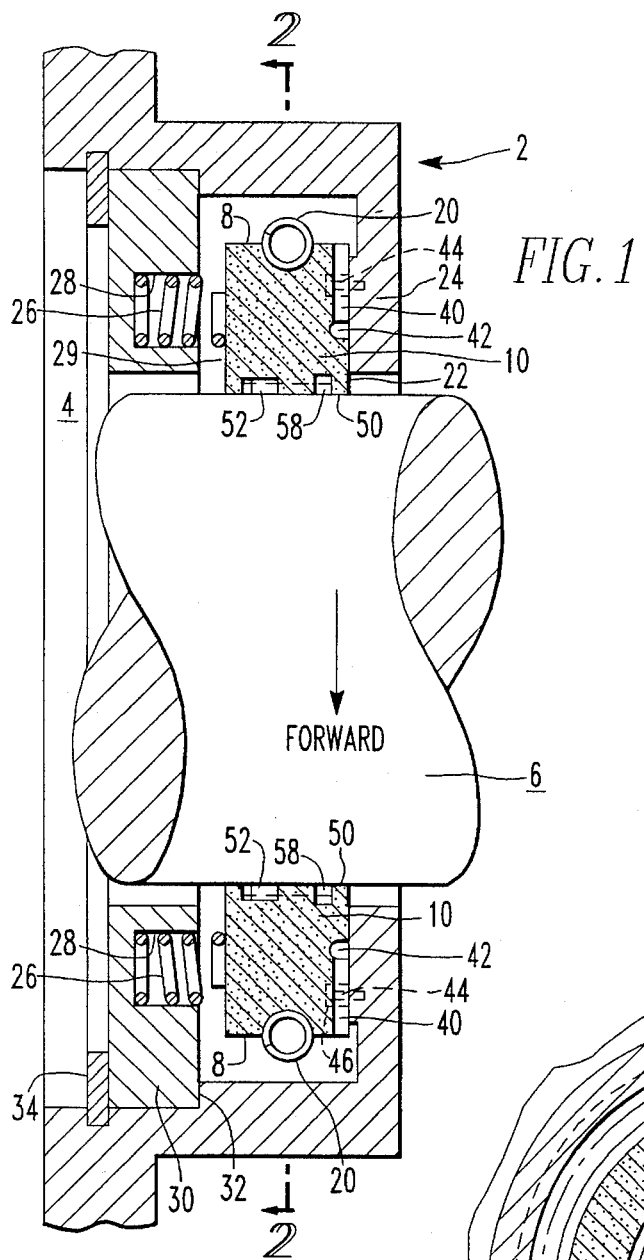
FIG. 1 is a vertical section through a seal in accordance with this invention sealing between a housing and a rotating shaft.
Figure 2:
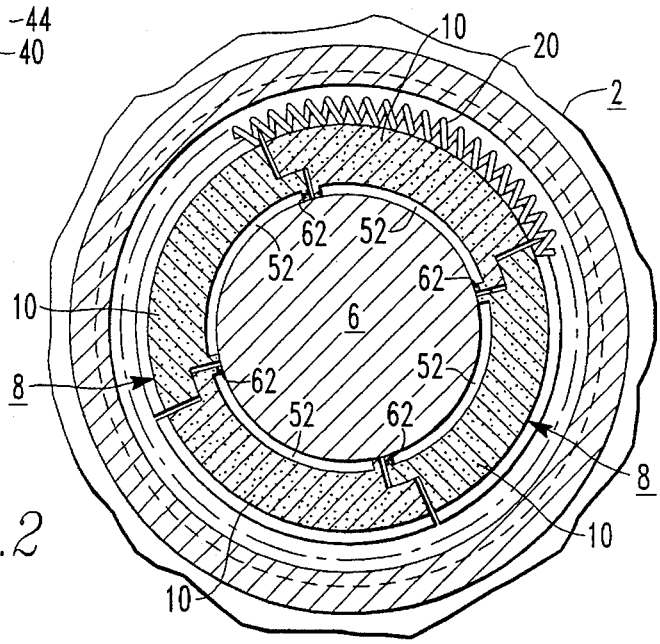
FIG. 2 is a vertical section taken on a plane indicated by the lines II—II in FIG. 1.
Figure 3:
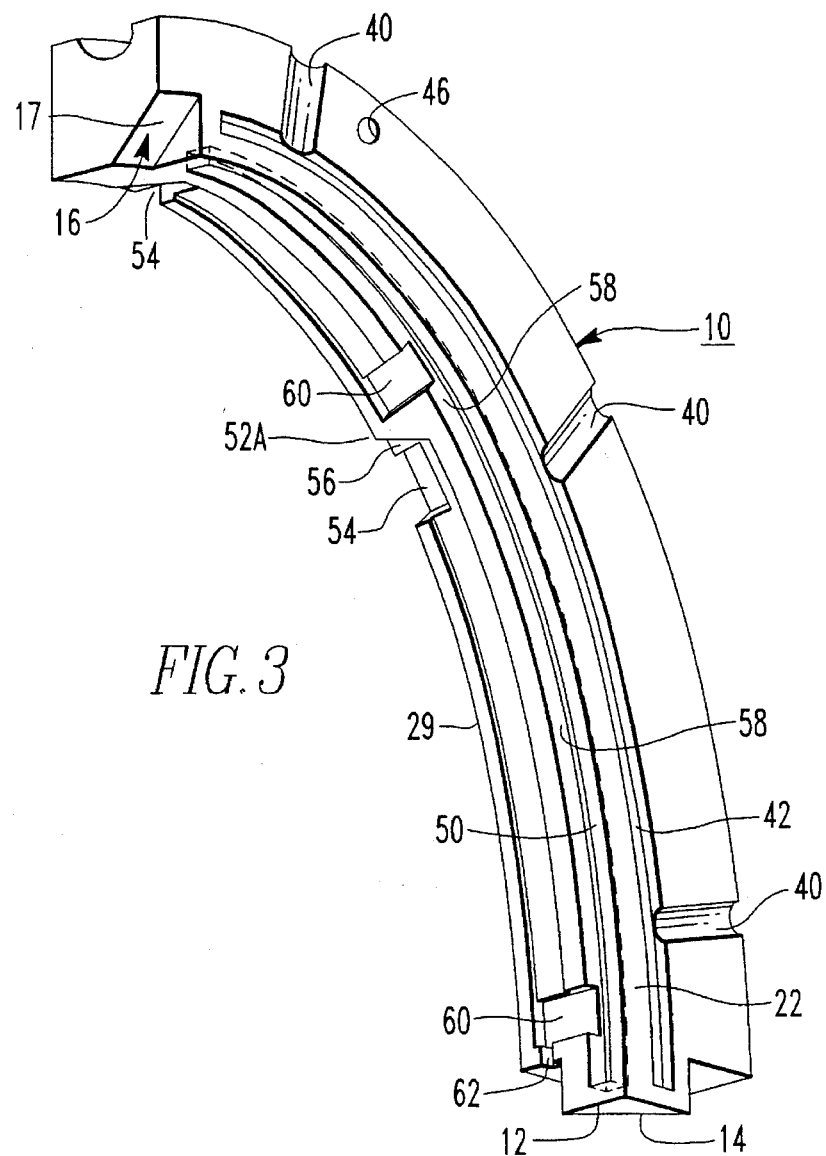
FIG. 3 is a perspective view of a segment of the seal ring shown in FIG. 1 taken from the low pressure side.

As shown in FIG. 1, a housing 2 forms a chamber 4 adapted to contain a fluid. A shaft 6 passes through housing 2 into chamber 4. A seal ring 8 has four segments 10 (FIG. 2). Each segment 10 has an offset tongue portion 12 (FIG. 3) with a diagonal face 14 which mates with a diagonally cut groove portion 16 on the adjacent segment 10 to provide for continuous sealing structure irrespective of any expansion or contraction of seal ring 8. The segments 10 are urged into contact with shaft 6 by a garter spring 20. The downstream faces 22 of segments 10 are urged against flange 24 of casing 2 by compression coil springs 26 contained in pockets 28 of closing ring 30 which is retained between casing shoulder 32 and retaining ring 34.

The downstream face 22 of each segment is provided with radial grooves 40 connected to a peripheral groove 42 to permit the passage of fluid from chamber 4 into groove 42 to counterbalance in part the fluid pressure on the high pressure side 29 to reduce the pressure loading of the segments against flange 24. Locking pins 44 (FIG. 1) mounted in flange 24 fit loosely in openings 46 in seal ring 8 to prevent the segments 10 from rotating and yet permit the segments to move towards and away from shaft 6.

Grooves 40 and 42 would be unnecessary where the fluid in chamber 4 is at nominal pressure.

Figure 4:
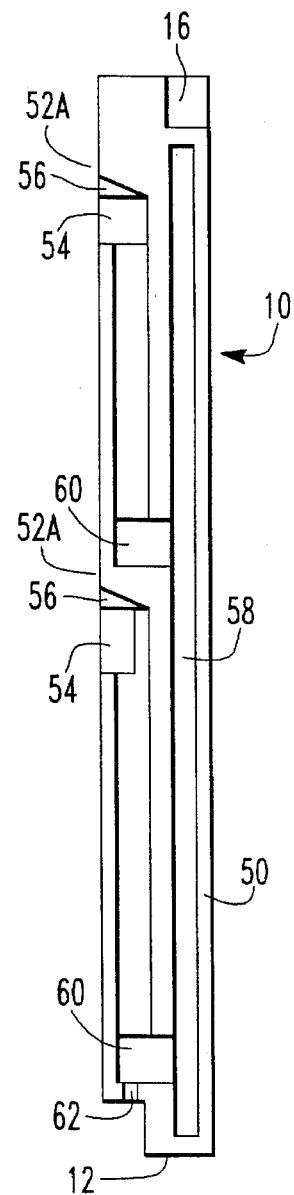
FIG. 4 is a development view of the sealing face of the seal ring of FIG. 3.

As shown in Stein U.S. Pat. No. 4,082,296 and in FIGS. 3 and 4 hereof, the sealing face 50 of each segment 10 has a pair of shallow recesses 52. Typically the depth of each recess 52 will be in the range of from about 0.002 to about 0.030 cm. depending on fluid viscosity and shaft speed. The end of each recess 52 in the direction of the forward rotation of shaft 6 opens into an axial cutout portion (i.e., a communication port) 54 in face 50 which also forms an opening in face 29 so that each recess 52 is thereby placed in direct communication with the fluid in chamber 4. Axial cutout portion 54 has an angled portion 56 which acts as a fluid scraper facilitating the flow of fluid into chamber 4.

In operation with a liquid in chamber 4, the forward rotation of shaft 6 causes a shear-drag on the liquid in recess 52 which would move the liquid in the recess toward the axial cutout portions 54 except that the reduced film thickness at the entry surface 52A impedes inflow into the recess. This, as explained in the aforementioned Stein patent, results in a lowering of the pressure in the recess and effectively creates negative hydrodynamic lift. This negative lift force, which urges the seal toward the shaft surface can be made of such magnitude that it precludes "surf-boarding" and excessive leakage past the seal.

While not essential to this invention, in the preferred embodiment, a circumferential groove 58 of greater depth than recesses 52 is provided in the inner circumferential face 50 of each segment 10 of seal ring 8. Circumferential groove 58 is deemed herein to serve as a pressure relief groove for the seal ring segments 10 with groove 58 being deeper than recesses 52 and being located downstream from each recess 52 on the seal surface 50. Each of the recesses 52 is connected to the pressure relief groove 58 by an axial passage 60. Thus, in each seal ring segment 10, a pressure relief groove 58 communicates with each of the recesses 52 thereof. The joint between each of the adjacent segments is made so that the mating surfaces 17 of groove 16 and surface 14 of tongue 12 are flat and complementary and are maintained in contact by the forces created on them by springs 20 and 26. Although the mating surface extend diagonally, they do provide a potential radial leakage path from the sealing surface 50 of each segment 10 to the low pressure or downstream surface 22. Thus, during certain operations and under certain conditions of the seal operation, for example, when a seal is operating in an oil mist atmosphere, under pressure, oil can collect in the gap between the tongue 12 and groove 14 and tends to blow through to the low pressure side of the seal. In accordance with this invention, such blowthrough, or leakage is prevented by connecting the interface between the tongue 12 and groove 16 to the relatively lower pressure grooves in the seal face. This is accomplished by providing a passageway from each interface of the tongue 12 and groove 16 through the tongue 12 portion of the segment 10 into the shallow recess 52 formed in the sealing face of the seal segment 10. The passageway or groove 62 is sized to permit flow from the interface of tongue 12 and groove 16 but is sized so as not to permit essentially free flow. Thus a pressure differential will be created across passageway 62 between the radial gap and recess 52 of a magnitude which will be predetermined for each seal design and application. For example, for a seal of 1.560 inch ID, a passageway of essentially the same depth as the seal recess 52 and a width of 0.010 to 0.012 inches will accomplish the pressure relief function, and prevent any inordinate pressure build-up or spill-over along the radial path between seal segments 10. It will be noted that the pressure in recess 52 during shaft rotation will be lower than the pressure on the high pressure side of the seal and flow of oil droplets will be from the radially extending interface of the tongue and groove into the recess 52. It should be noted that the size of passageway 62 is designed so that the magnitude of such flow will not reduce significantly the negative hydrodynamic lift forces created by the recesses 52 in the seal surface 50. It should be further noted that the passageway 62 communicates with recess 52 at the end of the recess that is remote from axial cutout portion 54, through which fluid flows from recesses 52 into chamber 4.

As is known, the seal ring segments 10 may be made of materials usually employed for a rubbing seal such as carbon-graphite or bronze.

It will be understood that the above-discussed embodiment of this invention is illustrative and not intended to be limiting thereof. For example, the employment of a pressure relief groove and pressure relief openings in other embodiments of the type illustrated in the Stein patent heretofore described, may also be employed and fall within the spirit and scope of this invention.

I claim:

1. In a rubbing seal for sealing between a rotatable shaft and a housing with a high pressure region and a lower pressure region in said housing and containing a fluid and further having (1) a seal ring mounted for movement toward and away from the shaft and formed by a plurality of circumferentially spaced mating segments each having a circumferential sealing face facing the shaft with a circumferential sealing portion sealing against the shaft mad with the sealing portion of adjacent segments in contact to form a continuous seal, said circumferential sealing portion being on the side of the seal ring face exposed to the lower pressure region, (2) means for sealing the radial space between each adjacent segment, (3) each of said segments including a recess in said sealing face which is spaced from the radial space between adjacent segments and each recess being connected by an opening in the seal ring face connecting the recess to the side of the seal ring exposed to the high pressure region so as to produce a negative hydrodynamic lift force on said segments to urge the seal ring toward the shaft due to fluid flow induced in said recesses by the rotation of said shaft, and (4) means for limiting rotation of said seal ring, the improvement comprising:

each segment having a pressure relieving passageway extending from a location in the radial space between segments to one of said recesses to provide a flow path for fluid in each radial space to pass into said one recess, thereby preventing leakage of fluid through said radial space.

2. The seal of claim 1 wherein each seal segment has a tongue portion at one circumferential end and a complementary shaped groove formed therein at the other circumferential end, each tongue portion mating with a groove of the adjacent segment to seal the radial space therebetween and wherein each segment is formed with said one recess therein spaced from both the tongue portion and the groove thereof, and wherein the passageway in each segment extends from the radial space between adjacent segments through the tongue portion of each segment to said one recess therein, respectively.

3. The seal of claim 2 wherein each such passageway is sized to provide a pressure drop between the radial space and the adjacent recess between which the passageway extends.

4. The seal of claim 3 wherein each passageway comprises a cutout in the sealing face of each segment.

5. The seal of claim 2 wherein said one recess of each segment is a circumferentially extending elongated recess in the sealing face thereof and wherein each segment is formed with a path adjacent a one end of the recess for fluid to flow toward the high pressure region of said housing, said one end being adjacent the end of the segment having the groove formed therein, and the pressure relieving passageway extending in said seal segment from the end of the segment having the tongue portion, through the tongue portion to the other end of said one recess.

6. The seal of claim 2 wherein the tongue portion and groove at each radial space have mating diagonal faces which engage when said seal ring is assembled.

7. The seal of claim 5 wherein each segment has two circumferentially spaced elongated recesses therein, said one recess located adjacent the tongue portion thereof and the other recess located adjacent the groove thereof and wherein the passageway extends from the radial space adjacent the tongue portion of each segment through the tongue portion and terminates in said one recess.

\* \* \* \* \*